United States Patent
Hsu et al.

(10) Patent No.: US 7,099,253 B2
(45) Date of Patent: Aug. 29, 2006

(54) METHOD AND APPARATUS FOR DVD RECOGNITION USING INNER AND OUTER TRACKING ERROR SIGNALS

(75) Inventors: Jen-Yu Hsu, Taipei (TW); Hsiang-Yi Fu, Taipei (TW); Tun-Chieh Lee, Taipei (TW); Fu-Hsiang Chen, Taipei (TW); Yao-Chou Tsai, Taipei (TW)

(73) Assignee: Lite-On It Corporation, Taipei (TW)

( * ) Notice: Subject to any disclaimer, the term of this patent is extended or adjusted under 35 U.S.C. 154(b) by 610 days.

(21) Appl. No.: 10/436,244

(22) Filed: May 12, 2003

(65) Prior Publication Data
US 2004/0151099 A1 Aug. 5, 2004

(30) Foreign Application Priority Data
Jan. 30, 2003 (TW) .............................. 92102170 A

(51) Int. Cl.
*G11B 7/00* (2006.01)
(52) U.S. Cl. ................. 369/53.23; 369/44.25; 369/44.26
(58) Field of Classification Search .................... None
See application file for complete search history.

(56) References Cited

U.S. PATENT DOCUMENTS

| | | | | | |
|---|---|---|---|---|---|
| 5,376,422 | A | * | 12/1994 | Kuribayashi et al. | 428/64.4 |
| 5,862,112 | A | * | 1/1999 | Nagai et al. | 369/44.36 |
| 5,909,419 | A | * | 6/1999 | Kamiyama | 369/53.23 |
| 6,137,758 | A | * | 10/2000 | Nemoto | 369/44.29 |
| 6,339,567 | B1 | * | 1/2002 | Shimamoto et al. | 369/44.35 |
| 6,747,931 | B1 | * | 6/2004 | Park | 369/53.23 |
| 6,822,936 | B1 | * | 11/2004 | Ono et al. | 369/53.23 |

OTHER PUBLICATIONS

Machine Translation of Ishikawa (JP 10312565 A).*

* cited by examiner

Primary Examiner—Brian E. Miller
Assistant Examiner—Peter Vincent Agustin
(74) Attorney, Agent, or Firm—Thomas, Kayden, Horstemeyer & Risley

(57) ABSTRACT

A DVD recognition method and apparatus is disclosed. First, a disc recognition apparatus uses a laser with a specific wavelength to irradiate an inner area of the DVD, thereby obtaining an inner TE signal. Then, the disc recognition apparatus uses the laser to irradiate an outer area of the DVD, thereby obtaining an outer TE signal. Afterward, the type of the DVD is recognized according to the inner and outer TE signals.

19 Claims, 3 Drawing Sheets

METHOD AND APPARATUS FOR DVD RECOGNITION USING INNER AND OUTER TRACKING ERROR SIGNALS

BACKGROUND OF THE INVENTION

1. Field of the Invention

The present invention relates to a disc recognition method and apparatus, and particularly to a DVD (Digital Versatile Disc) recognition method and apparatus that recognizes DVDs as DVD-RAM or DVD-RW/DVD+RW according to the difference between tracking error signals corresponding to the inner and outer circles of the DVD respectively.

2. Description of the Related Art

Optical storage media are important in the evolution of data storage media. With the development of optical storage media, data can be recorded and backed up to high capacity, light discs, with the optical storage media taking the place of traditional data storage media. In optical storage media, DVD has significant advantages in data density and capacity compared to VCD and CD, therefore, DVD players (DVD-ROMs) are taking the place of VCD or CD players gradually and becoming essential equipment.

DVD players are compatible with VCD and CD, that is, can read VCD and CD including CD, CD-R, and CD-RW and DVD including DVD, DVD-R, DVD+RW, DVD-RW, and DVD-RAM. After the type of disc is recognized, the DVD-ROMs use an appropriate laser with a specific wavelength to read data from the disc.

In conventional disc recognition method, Taiwan Patent No. 397969 recognizes a disc according to the thickness of protection layer of the disc. For example, with the data reflection layer of CD at 1.2 mm and the data reflection layer of DVD is 0.6 mm, the disc can be recognized by detecting the thickness of protection layer of the disc. In addition, FIG. 1 shows a DVD recognition method. After the disc is recognized as a DVD, in step S11, the DVD-ROM focuses servo operation on the disc. Then, in step S12, the type of the DVD is recognized according to the magnitude of DPP (Differential Push Pull) TE (Tracking Error) signal of the disc. If the magnitude of the DPP TE signal is large (Yes in step S13), in step S14, the DVD is recognized as a DVD-RAM. If the magnitude of the DPP TE signal is small (No in step S13), in step S15, the DVD is recognized as a DVD-RW/DVD+RW.

However, since the thickness of dyestuff and quality of DVDs of respective manufacturers are different, there is no effective and accurate recognition rule provided by the above conventional method. If the recognition result is wrong, more time will be spent on another recognition process, or the DVD-ROM will fail to read the disc.

SUMMARY OF THE INVENTION

It is therefore an object of the present invention to provide a DVD recognition method and apparatus that recognizes DVDs as DVD-RAM or DVD-RW/DVD+RW according to the difference between tracking error signals corresponding to the inner and outer circles of the DVD respectively.

To achieve the above object, the present invention provides a DVD recognition method. First, a disc recognition apparatus uses a laser with a specific wavelength to irradiate an inner area of the DVD, thereby obtaining an inner TE signal. Then, the disc recognition apparatus uses the laser to irradiate an outer area of the DVD, thereby obtaining an outer TE signal. Afterward, the type of the DVD is recognized according to the inner and outer TE signals.

Further, a DVD recognition apparatus according to the present invention is provided. The apparatus includes at least an optical read means and a process module. The optical read means uses a laser with a specific wavelength to irradiate an inner area and an outer area of the DVD respectively, thereby obtaining a corresponding inner TE signal and a corresponding outer TE signal. The process module recognizes the type of the DVD according to the inner and outer TE signals.

If the difference between the inner and outer TE signals is larger than a predetermined value, the DVD is recognized as a DVD-RAM, otherwise, the DVD is recognized as a DVD-RW/DVD+RW.

The disc recognition apparatus can be deployed in a DVD-ROM or DVD-RW ROM drive or player. The outer area is located in the rewriteable area of the DVD, and the inner area can be located in the embossed data area of the DVD (DVD-RAM).

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
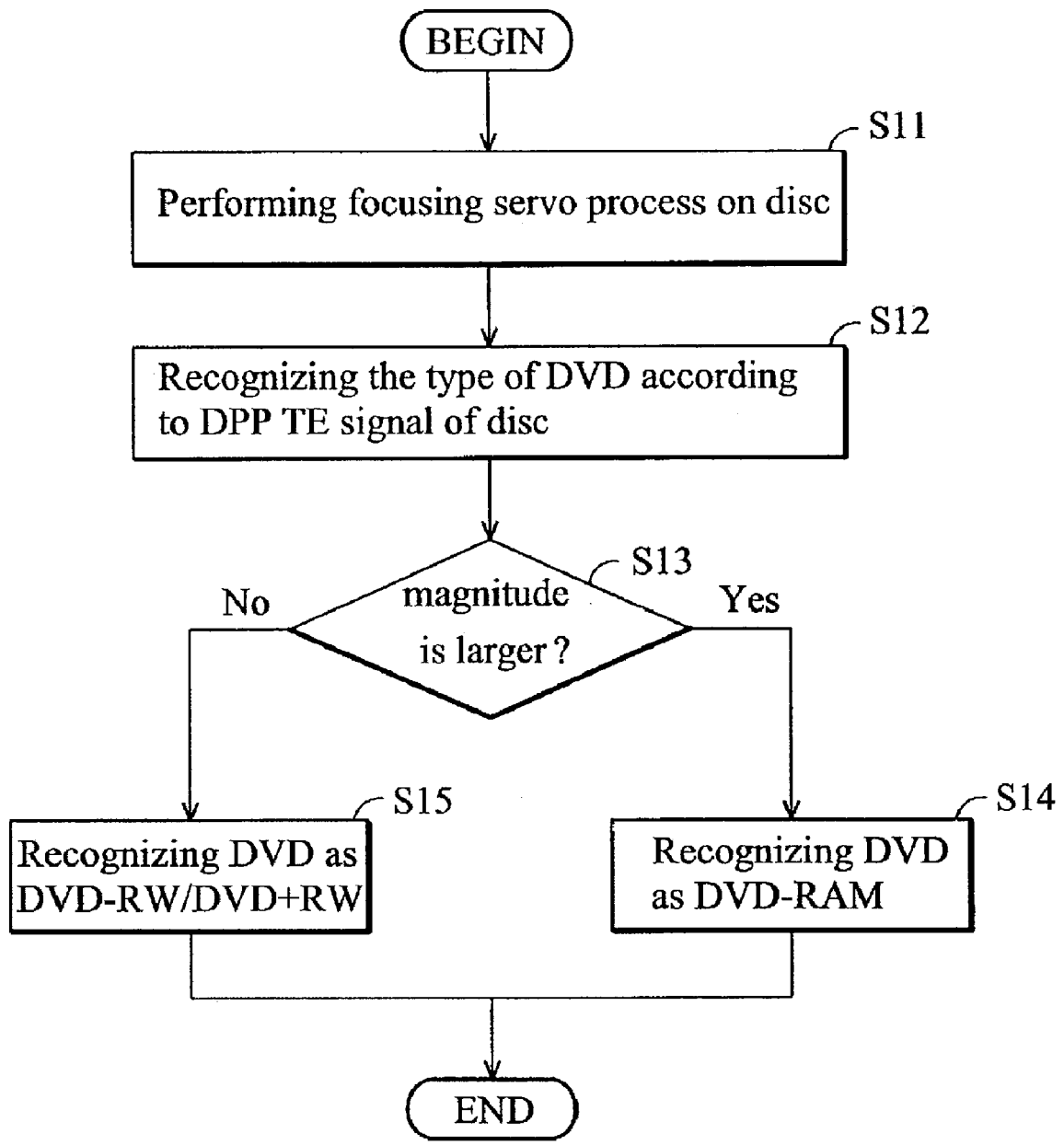
FIG. 1 is a flowchart showing the process of a conventional DVD recognition method.
Figure 2:
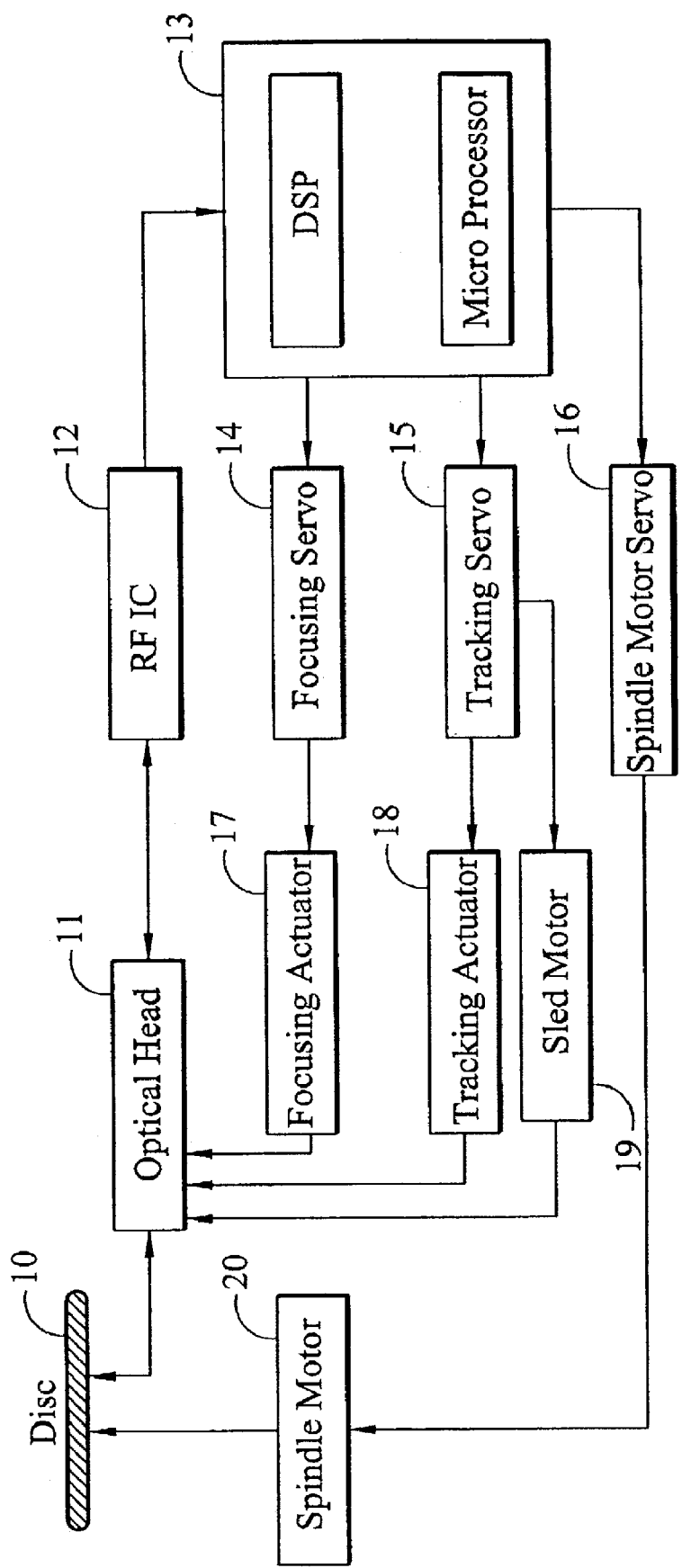
FIG. 2 is a schematic diagram illustrating the architecture of the DVD recognition apparatus according to the embodiment of the present invention.

FIG. 2 illustrates the architecture of the DVD recognition apparatus according to the embodiment of the present invention. In the embodiment, the disc recognition apparatus may be a disc servo system, that is, the disc recognition apparatus may be applied in a DVD-ROM or recordable DVD drive or player.

The optical head (optical read means) 21 reads reflection signal from the disc 20. After the signal is amplified and processed by RF (Radio Frequency) IC 22, the FE (Focusing Error) signal, TE (Tracking Error) signal and relative data and signals are input to DSP (Digital Signal Processor) and micro processor (process module) 23.

After the micro processor 23 analyzes the received data and computes related operations, the disc type is recognized, servo driver signals are computed, and the micro processor 23 outputs the signals to corresponding servos (focusing servo 24, tracking servo 25 and spindle motor servo 26) to control the actuators (focusing actuator 27, tracking actuator 28, sled motor 29 and spindle motor 30) to ensure accuracy when reading or writing (recording) data. The process of disc recognition of the process module is described later.

The distance between the data reflection layer of the disc and the optical read means is dependent on the disc type. Therefore, when a disc is loaded, a focusing servo process is perform. First, the optical read means will move close to the disc and then move down from the disc to detect the thickness of data reflection layer of the disc, thereby adjusting the optical head at the appropriate position, so as to read the disc correctly. The signal collected during the focusing servo process is called a FE (Focusing Error) signal.

In addition, since the optical read means works in an arc manner and the related components of the DVD-ROM are not tangential with the circle of the disc, the TE (Tracking Error) signal is generated. It should be noted that the principles of the FE and TE signals are clearly described in the standard specification, and are therefore omitted here.

The design property of each DVD can be used to recognize the type of the DVD. For DVD-RW/DVD+RW, the whole disc has the same property. However, there are at least two areas, such as an embossed data area and a rewriteable area in the DVD-RAM. The embossed data area records control data, such as disc type, format, record method, and others. The rewriteable area can be used to record data.

Figure 3:
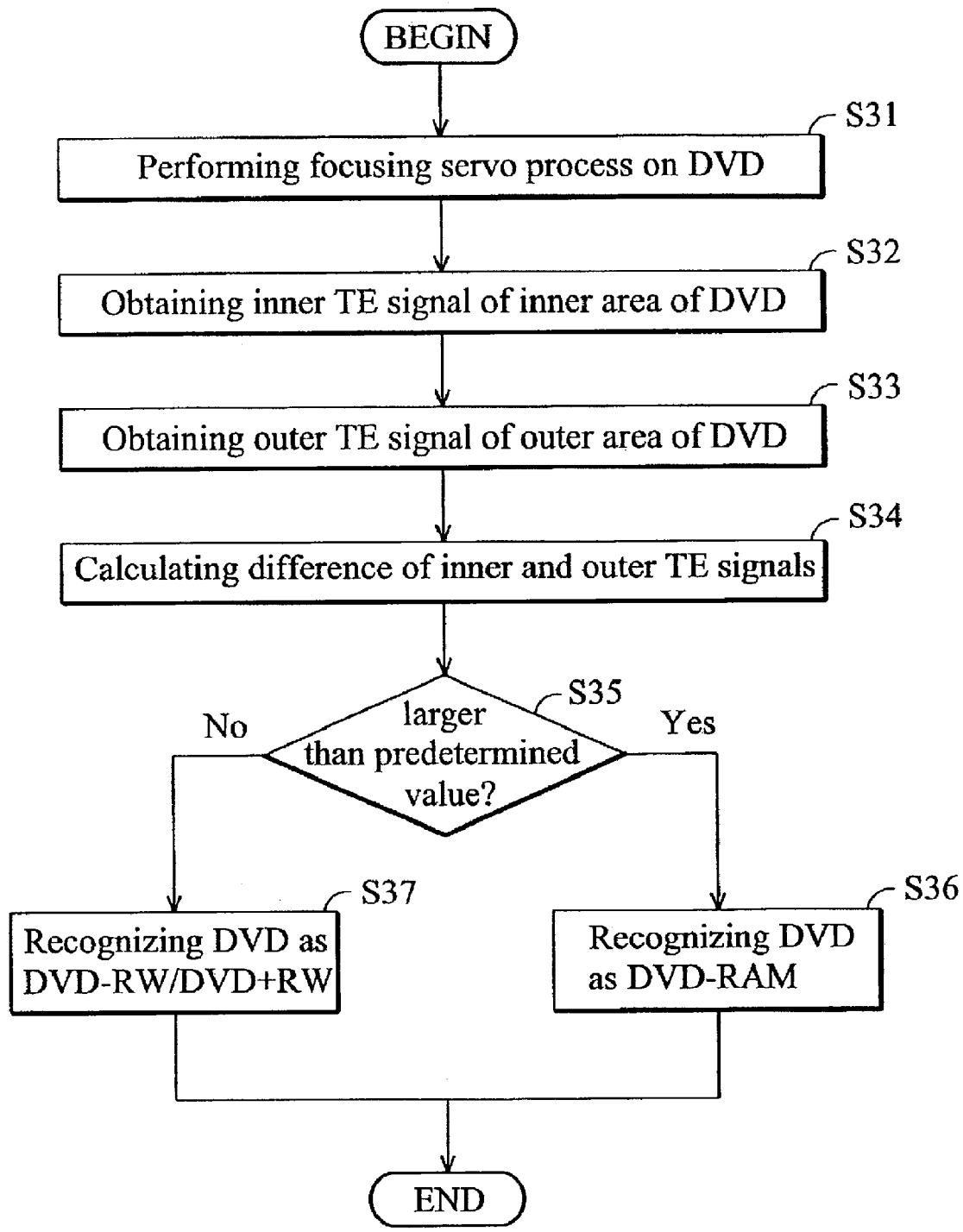
FIG. 3 is a flowchart showing the process of the DVD recognition method according to the embodiment of the present invention.

FIG. 3 shows the process of the DVD recognition method according to the embodiment of the present invention. The embodiment of the present invention is suitable for use in the disc recognition apparatus, such as for DVD-ROM or recordable DVD drive or player.

After the disc is recognized as a DVD, in step S31, the disc recognition apparatus focuses servo process on the DVD. Then, in step S32, the disc recognition apparatus uses a laser of a specific wavelength, such as the DVD laser with 650 nm to irradiate an inner area of the DVD, thereby obtaining an inner TE signal. Then, in step S33, the disc recognition apparatus uses the DVD laser to irradiate an outer area of the DVD, thereby obtaining an outer TE signal.

It should be noted that the outer area is located in the rewriteable area of the DVD, and the inner area can be located in the embossed data area of the DVD (DVD-RAM). Further, the inner and outer TE signals can be DPP (Differential Push Pull) TE signals.

Afterward, in step S34, a difference between the inner and outer TE signals is calculated. Thereafter, in step S35, it is determined whether the difference is larger than a predetermined value. If so (Yes in step S35), in step S36, the DVD is recognized as a DVD-RAM, otherwise, in step S37, the DVD is recognized as a DVD-RW/DVD+RW.

It should be noted that since the TE signals corresponding to the embossed data area (inner area) and the rewriteable area (outer area) of the DVD-RAM are different, and the TE signals corresponding to the inner area and the outer area of the DVD-RW/DVD+RW are almost the same, the above predetermined value can be set according to applications. In general applications, the predetermined value can be set as 0×28 (h).

As a result, the present invention provides an effective and accurate DVD recognition method and apparatus to recognize DVD. The DVD can be recognized as a DVD-RAM or DVD-RW/DVD+RW according to the difference between tracking error signals corresponding to the inner and outer circles of the DVD respectively.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A DVD recognition method, comprising the steps of:
    irradiation of an inner area of a DVD by a disc recognition apparatus using a laser with a specific wavelength, thereby obtaining an inner TE (tracking error) signal;
    irradiation of an outer area of the DVD by the disc recognition apparatus using the laser with specific wavelength, thereby obtaining an outer TE signal; and
    recognizing the DVD according to the inner and outer TE signals.

2. The DVD recognition method as claimed in claim 1 wherein recognition of the DVD according to the inner and outer TE signals comprises the steps of:
    calculating a difference between the inner and outer TE signals; and
    recognizing the DVD as DVD-RAM if the difference is larger than a predetermined value.

3. The DVD recognition method as claimed in claim 2 wherein recognition of the DVD according to the inner and outer TE signals further comprises recognizing the DVD as DVD-RW/DVD+RW if the difference is not larger than the predetermined value.

4. The DVD recognition method as claimed in claim 2 wherein the inner area is located in an embossed area of the DVD-RAM.

5. The DVD recognition method as claimed in claim 1 further comprising performance of a focusing servo process on the DVD by the disc recognition apparatus.

6. The DVD recognition method as claimed in claim 1 wherein the inner and outer TE signals are DPP (Differential Push Pull) TE signals.

7. The DVD recognition method as claimed in claim 1 wherein the laser with the specific wavelength is a DVD laser.

8. The DVD recognition method as claimed in claim 1 wherein the disc recognition apparatus is a DVD-ROM drive or player.

9. The DVD recognition method as claimed in claim 1 wherein the disc recognition apparatus is a recordable DVD drive or player.

10. The DVD recognition method as claimed in claim 1 wherein the outer area is located in a rewriteable area of the DVD.

11. A DVD recognition apparatus, comprising:
    an optical read means to irradiate an inner area of a DVD using a laser with a specific wavelength, thereby obtaining an inner IE (tracking error) signal, and to irradiate an outer area of the DVD using the laser with the specific wavelength, thereby obtaining an outer TE signal; and
    a process module coupled to the optical read means to receive the inner and outer TE signals, and recognize the DVD according thereto.

12. The DVD recognition apparatus as claimed in claim 11 wherein recognition of the DVD according to the inner and outer TE signals of the process module comprises the steps of:
    calculating a difference between the inner and outer TE signals; and
    recognizing the DVD as DVD-RAM if the difference is larger than a predetermined value.

13. The DVD recognition apparatus as claimed in claim 12 wherein recognition of the DVD according to the inner and outer TE signals of the process module further comprises recognizing the DVD as DVD-RW/DVD+RW if the difference is not larger than the predetermined value.

14. The DVD recognition apparatus as claimed in claim 12 wherein the inner area is located in an embossed data area of the DVD-RAM.

15. The DVD recognition apparatus as claimed in claim 11 wherein the inner and outer TE signals are DPP (Differential Push Pull) TE signals.

16. The DVD recognition apparatus as claimed in claim 11 wherein the laser with the specific wavelength is a DVD laser.

17. The DVD recognition apparatus as claimed in claim 11 wherein the DVD recognition apparatus is a DVD-ROM drive or player.

18. The DVD recognition apparatus as claimed in claim 11 wherein the DVD recognition apparatus is a recordable DVD drive or player.

19. The DVD recognition apparatus as claimed in claim 11 wherein the outer area is located in a rewriteable area of the DVD.

* * * * *